(12) United States Patent
Viggers et al.

(10) Patent No.: US 10,540,738 B2
(45) Date of Patent: *Jan. 21, 2020

(54) METHODS AND SYSTEMS FOR MONITORING THE SUBSET OF GPU COMPONENTS USED BY AN APPLICATION IN SAFETY CRITICAL ENVIRONMENTS

(71) Applicant: Channel One Holdings Inc., Tampa, FL (US)

(72) Inventors: Stephen Viggers, Waterloo (CA); Tomislav Malnar, Waterloo (CA); Sherwyn R. Ramkissoon, Waterloo (CA); Gregory Szober, Waterloo (CA); Aidan Fabius, Waterloo (CA); Kenneth Wenger, Waterloo (CA); John McCormick, Waterloo (CA)

(73) Assignee: Channel One Holdings Inc., Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,980

(22) Filed: Jun. 4, 2019

(65) Prior Publication Data

US 2019/0355085 A1    Nov. 21, 2019

Related U.S. Application Data

(63) Continuation of application No. 16/133,841, filed on Sep. 18, 2018, now Pat. No. 10,354,357, which is a
(Continued)

(51) Int. Cl.
*G06T 1/20* (2006.01)
*G06T 1/60* (2006.01)
*G06F 11/22* (2006.01)

(52) U.S. Cl.
CPC ............ *G06T 1/20* (2013.01); *G06F 11/2236* (2013.01); *G06T 1/60* (2013.01)

(58) Field of Classification Search
None
See application file for complete search history.

(56) References Cited

U.S. PATENT DOCUMENTS 8,933,934 B1    1/2015  Hill et al.
2004/0249618 A1*  12/2004  Fine ...................... G06F 11/261
                                                         703/2
(Continued)

OTHER PUBLICATIONS

Bird et al., "Automatic generation of random self-checking test cases", pp. 229-245, IBM Systems Journal, vol. 22, No. 3, 1983 (Year: 1983) (Year: 1983).*

(Continued)

*Primary Examiner* — Tapas Mazumder
(74) *Attorney, Agent, or Firm* — Woods Oviatt Gilman LLP; Dennis B. Danella, Esq.

(57) ABSTRACT

Methods, systems, and computer-readable media for monitoring a graphics processing unit (GPU) of a host computer system, including providing at least one test seed and at least one subsystem command to the GPU; receiving at least one test result from the GPU in response to providing the at least one test seed and at least one subsystem command to the GPU; and if the at least one test result does not correspond to at least one expected result, identifying the GPU as being in an undesired state. The subsystems to be tested may be a subset of all subsystems. The determination of subsystems to be tested may be determined in real-time, based on graphical application instructions. The subsystems to be tested may also be pre-determined.

18 Claims, 10 Drawing Sheets

Related U.S. Application Data continuation of application No. 15/365,138, filed on Nov. 30, 2016, now Pat. No. 10,169,840.

(60) Provisional application No. 62/260,985, filed on Nov. 30, 2015.

(56) References Cited

U.S. PATENT DOCUMENTS

| | | | |
|---|---|---|---|
| 2012/0154310 A1* | 6/2012 | Denny | G06Q 30/02 345/173 |
| 2015/0070367 A1 | 3/2015 | Fam et al. | |
| 2016/0155131 A1* | 6/2016 | Miloslavsky | G06Q 30/018 705/317 |

OTHER PUBLICATIONS

Bird et al., "Automatic generation of random self-checking test cases", pp. 229-245, IBM Systems Journal, vol. 22, No. 3, 1983.
Eftimescu, Nicolae, "European Search Report", dated Oct. 9, 2017 for application No. 16201567.1, European Patent Office, Munich, Germany.

* cited by examiner

METHODS AND SYSTEMS FOR MONITORING THE SUBSET OF GPU COMPONENTS USED BY AN APPLICATION IN SAFETY CRITICAL ENVIRONMENTS

RELATED APPLICATIONS

This application is a continuation of U.S. patent application Ser. No. 16/133,841 filed Sep. 18, 2018, which is a continuation of U.S. patent application Ser. No. 15/365,138 filed Nov. 30, 2016, which claims the benefit of U.S. Provisional Patent Application No. 62/260,985 filed Nov. 30, 2015, both entitled METHODS AND SYSTEMS FOR MONITORING THE SUBSET OF GPU COMPONENTS USED BY AN APPLICATION IN SAFETY CRITICAL ENVIRONMENTS, the entire contents of which are hereby incorporated by reference herein for all purposes.

TECHNICAL FIELD

The embodiments disclosed herein relate to monitoring a Graphics Processing Unit (GPU) in rendering computer graphics and, in particular, to methods and systems for monitoring a subset of GPU components used by graphical applications in safety-critical environments, such as in aviation.

INTRODUCTION

The following paragraphs are not an admission that anything discussed in them is prior art or part of the knowledge of persons skilled in the art.

GPUs generally include multiple subsystems. Occasionally, GPU subsystems may stop operating according to their desired operation. In particular, graphical applications may use various subsystems of the GPU to draw an image. However, graphical applications may not use all subsystems of the GPU.

Graphical applications running in a safety-critical environment may require assurances that an image created by the GPU corresponds to the image that the graphical applications actually intended.

SUMMARY OF VARIOUS EMBODIMENTS

According to one aspect, a computer-implemented method of monitoring a graphics processing unit (GPU) of a host computer system. The method comprises: providing at least one test seed and at least one subsystem command to the GPU, receiving at least one test result from the GPU in response to providing the at least one test seed and the at least one subsystem command to the GPU, and if the at least one test result does not correspond to at least one expected result, identifying the GPU as being in an undesired state.

The method may further include monitoring one or more host computer system application commands to the GPU for a test interval.

The method may further include determining whether the host computer system application commands cause subsystems of the GPU to be active for that test interval, wherein the at least one subsystem command to the GPU is directed to subsystems determined to be active. The test interval may include one of a time period and a display frame.

The method may further include identifying one or more subsystems of the GPU that are not instructed by host computer system application commands as being unexposed subsystems; and determining whether unexposed subsystems are active, wherein the at least one subsystem command to the GPU is further directed to unexposed subsystems determined to be active. The step of determining whether unexposed subsystems are active may include retrieving a GPU state for an unexposed subsystem; and if the GPU state does not correspond to an expected GPU state, identifying the unexposed subsystem as being active. The step of monitoring one or more host computer system application commands to the GPU may include scanning a memory buffer of the host computer system for application commands directed to the GPU.

The some cases subsystems of the GPU may include at least one of a plurality of subsystem types; and the at least one subsystem command to the GPU is directed to at least one subsystem of each subsystem type having at least one active subsystem.

In some cases the step of providing at least one test seed and at least one subsystem command to the GPU may include retrieving the at least one subsystem command to the GPU from a plurality of stored subsystem commands to the GPU.

In some cases the step of retrieving the at least one subsystem command to the GPU may include identifying the stored subsystem command corresponding to the retrieved at least one subsystem command as having been retrieved.

In some cases, the at least one subsystem command corresponds to stored subsystem commands that are not identified as having been retrieved; and the step of retrieving the at least one subsystem command to the GPU further comprises if each of the stored subsystem commands are identified as having been retrieved, eliminating the identification of stored subsystem commands as having been retrieved. In some cases, each of the stored subsystem commands is retrieved with a minimum frequency for that subsystem command.

In some cases, the plurality of stored subsystem commands to the GPU comprises an ordered set of subsystem commands to the GPU having a first subsystem command and a last subsystem command; and the step of retrieving the at least one subsystem command to the GPU further comprises, before the step of identifying the stored subsystem command corresponding to the retrieved at least one subsystem command as having been retrieved: if each of the stored subsystem commands are identified as having been retrieved, eliminating the identification of stored subsystem commands as having been retrieved; if at least one of the stored subsystem commands are identified as having been retrieved, retrieving a subsystem command that is not identified as having been retrieved and that follows a subsystem command that is identified as having been retrieved; and if none of the stored subsystem commands are identified as having been retrieved, retrieving the first subsystem command.

In some cases the step of providing at least one test seed and at least one subsystem command to the GPU further comprises: retrieving the at least one test seed from a plurality of stored test seeds based on the at least one subsystem command, and retrieving the at least one expected result from a plurality of stored expected results based on the retrieved at least one test seed. The step of retrieving the at least one expected result may further comprise retrieving the at least one expected result based on the at least one subsystem command.

The step of providing at least one test seed and at least one subsystem command to the GPU may comprise one of randomly generating the at least one test seed; and retrieving the at least one test seed from a plurality of stored test seeds;

and the step of receiving at least one test result from the GPU further comprises determining, by a central processing unit (CPU) of the host computer system, the at least one expected result based on the at least one test seed and the at least one subsystem command.

In some cases the at least one test seed comprises data that is processed to generate pixels that are located in a non-visible portion of a display screen coupled to the GPU.

In some cases the at least one test seed comprises data that is processed to generate pixels that are located in a non-visible portion of memory coupled to the GPU.

In some cases the at least one test seed comprises data that is processed to generate pixels that are located in a visible portion of a display screen coupled to the GPU; and the display screen is not updated with pixels that are generated from the at least one test result.

In some cases the method may further comprise, if the GPU is identified as being in an undesired state, repeating the steps of providing at least one test seed and at least one subsystem command to the GPU and receiving at least one test result from the GPU to identify a subsystem of the GPU that is in an undesired state, wherein the at least one subsystem command of repeated steps is different from the at least one subsystem command of the first step. The plurality of subsystem types may include a color modification type, an enabling-disabling type, a per-primitive type, and an always-active type. The subsystems of the color modification type may include at least one of a pixel shader, a texture sampler, an alpha blender, a color logic operator, a color masker, a multi-sampler, and a ditherer. The subsystems of the enabling-disabling type may include at least one of a geometry shader, a depth tester, a stencil tester, a scissor tester, and an alpha tester. The subsystems of the per-primitive type may include at least one of a ditherer, a line stippler, a cull face tester, a polygon offset, a polygon outliner, a perspective divider, and a viewport transformation. The subsystems of the always-active type may include at least one of a vertex shader, a pixel shader, a perspective divider, and a viewport transformation.

According to another aspect, a non-transitory computer-readable storage medium having instructions stored thereon for execution by at least one processing unit for implementing a method comprising providing at least one test seed and at least one subsystem command to the GPU, receiving at least one test result from the GPU in response to providing the at least one test seed and the at least one subsystem command to the GPU; and if the at least one test result does not correspond to at least one expected result, identifying the GPU as being in an undesired state.

According to another aspect, a system to monitor a graphics processing unit (GPU) of a host computer system for malfunctions, the system comprising at least one processing unit; and a non-transitory computer-readable storage medium having instructions stored thereon for implementing a method as described generally herein.

Other aspects and features will become apparent, to those ordinarily skilled in the art, upon review of the following description of some exemplary embodiments.

BRIEF DESCRIPTION OF THE DRAWINGS

For a better understanding of the various embodiments described herein, and to show more clearly how these various embodiments may be carried into effect, reference will be made, by way of example only, to the accompanying drawings which show at least one exemplary embodiment, and in which are now described.

Figure 1:
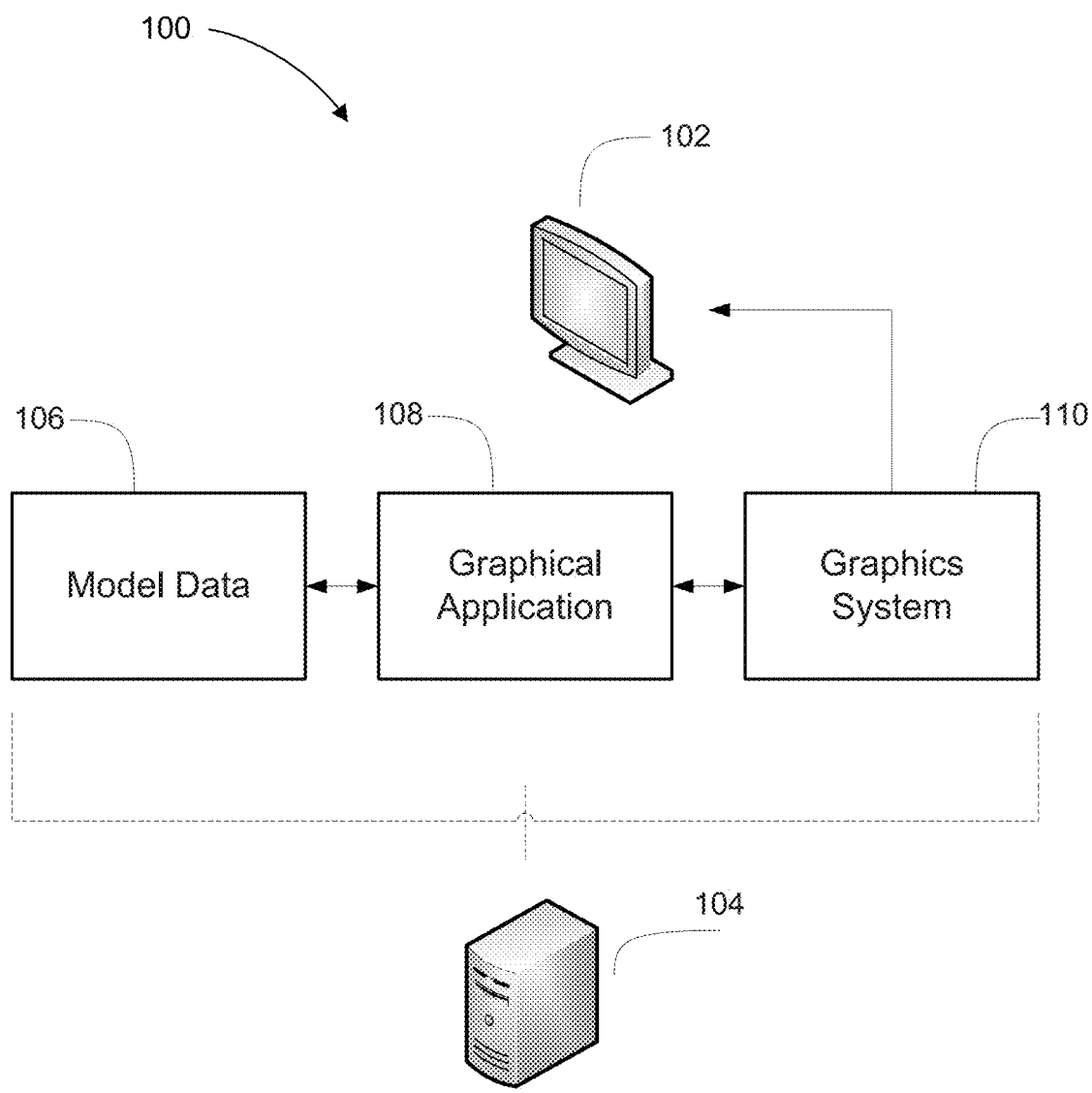
FIG. 1 is a schematic diagram of a host computer system according to at least one embodiment.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

Various apparatus or processes will be described below to provide an example of one or more embodiments. No embodiment described below limits any claimed embodiment and any claimed embodiment may cover processes or apparatus that differ from those described below. The claimed embodiments are not limited to apparatus or processes having all of the features of any one apparatus or process described below or to features common to multiple or all of the apparatus described below. It is possible that an apparatus or process described below is not an embodiment of any claimed embodiment. Any embodiment disclosed below that is not claimed in this document may be the subject matter of another protective instrument, for example, a continuing patent application, and the applicants, inventors or owners do not intend to abandon, disclaim or dedicate to the public any such embodiment by its disclosure in this document.

The terms "an embodiment," "embodiment," "embodiments," "the embodiment," "the embodiments," "one or more embodiments," "some embodiments," and "one embodiment" mean "one or more (but not all) embodiments of the subject matter described in accordance with the teachings herein," unless expressly specified otherwise.

The terms "including," "comprising" and variations thereof mean "including but not limited to", unless expressly specified otherwise. A listing of items does not imply that any or all of the items are mutually exclusive, unless expressly specified otherwise. In addition, the terms "a," "an" and "the" mean "one or more," unless expressly specified otherwise.

It should also be noted that the terms "coupled" or "coupling" as used herein can have several different meanings depending in the context in which these terms are used. For example, the terms coupled or coupling can have a mechanical or electrical connotation. For example, as used herein, the terms coupled or coupling can indicate that two elements or devices can be directly connected to one another or connected to one another through one or more intermediate elements or devices via an electrical element or electrical signal (either wired or wireless) or a mechanical element depending on the particular context.

Further, although processes, methods, and the like may be described (in the disclosure and/or in the claims) having acts in a certain order, such processes and methods may be configured to work in alternate orders while still having utility. In other words, any sequence or order of actions that may be described does not necessarily indicate a requirement that the acts be performed in that order. The acts of processes and methods described herein may be performed in any order that is practical and has utility. Further, some actions may be performed simultaneously, if possible, while others may be optional, if possible.

When a single device or article is described herein, it may be possible that more than one device/article (whether or not they cooperate) may be used in place of a single device/article. Similarly, where more than one device or article is described herein (whether or not they cooperate), it may be possible that a single device/article may be used in place of the more than one device or article.

The term "GPU", as used herein, broadly refers to any graphics rendering device. This may include, but is not limited to discrete GPU integrated circuits, field-programmable gate arrays (FPGAs), application-specific integrated circuits (ASICs), discrete devices otherwise operable as central processing units, and system-on-a-chip (SoC) implementations. This may also include any graphics rendering device that renders 2D or 3D graphics.

The term "CPU", as used herein, broadly refers to a device with the function or purpose of a central processing unit, independent of specific graphics-rendering capabilities, such as executing programs from system memory. In some implementations, it is possible that a SoC may include both a GPU and a CPU; in which case the SoC may be considered both the GPU and the CPU.

Generally, graphical applications running in a safety-critical environment may require assurances that an image created by the GPU corresponds to the image that the graphical applications actually intended.

In some cases, integrity monitors may be used to assure that an image created by the GPU matches the image that a graphical application intended to draw. Some integrity monitors may be implemented by performing tests of the GPU to ensure that the GPU is operating as expected.

In some cases, GPUs will undergo conformance testing. Conformance testing may show that, under normal operation, a GPU will produce expected results. However, conformance testing is typically performed in a testing environment and not in a production environment (i.e., while an aircraft is airborne). Furthermore, conformance test is typically performed on a discrete basis, and not on a continuous basis.

GPUs may also undergo Power-on Built-In-Testing (PBIT). PBIT may test a GPU in a production environment. However, PBIT is normally performed when a GPU is initially powered-on. Because PBIT is performed at initial power-on, PBIT may not detect a failure after initial power-on.

In some cases, GPUs may undergo Continuous Built-In-Testing (CBIT). CBIT may test a GPU on a continuous basis. However, CBIT is typically performed on a limited subset of GPU subsystems. Moreover, CBIT of GPU subsystems may be computationally intensive. Such use of computing resources may reduce the performance of the GPU to unacceptable levels for the graphical application. Thus, the subset of GPU subsystems that may undergo CBIT is generally constrained by performance requirements for the GPU.

Referring now to FIG. 1, illustrated therein is a host computer system 100 according to at least one embodiment. The host computer system 100 comprises a computer display or monitor 102, and a computer 104. Other components of the system are not shown, such as user input devices (e.g., a mouse, a keyboard, etc.). Generally the host computer system 100 may be used for displaying graphics objects or images on the display or monitor 102.

According to at least one embodiment, the host computer system 100 may be a computer system used in a motorized vehicle such as an aircraft, marine vessel, or rail transport vehicle, or in a medical imaging system, a transportation system, or any other system that uses a computer and monitor. In some cases, the computer system may be in use in a safety critical environment.

The computer 104 may generally include system memory, storage media, and a processor. In some cases, the computer 104 may also include dedicated graphics hardware, which may include a graphics system 110 and video memory. In other cases, the computer 104 may perform at least some graphics-related operations using the processor and system memory.

According to at least one embodiment, the host computer system 100 may be a safety-critical, mission-critical, or high-reliability system. In such a case, the host computer system 100 may be required to comply with specific operating standards, such as standards related to reliability and fault tolerance.

In order to display a rendering of the model data 106 on the monitor 102, such as may be determined by a graphical application 108 of the host computer system 100, the model data 106 must first be processed by a graphics system 110. The graphics system 110 may receive the model data 106 and may also receive instructions from the graphical application 108 as to how the model data 106 should be processed.

The graphics system 110 may include any or all of a GPU and video memory, and it may use any or all of the CPU and system memory as well.

Figure 2:
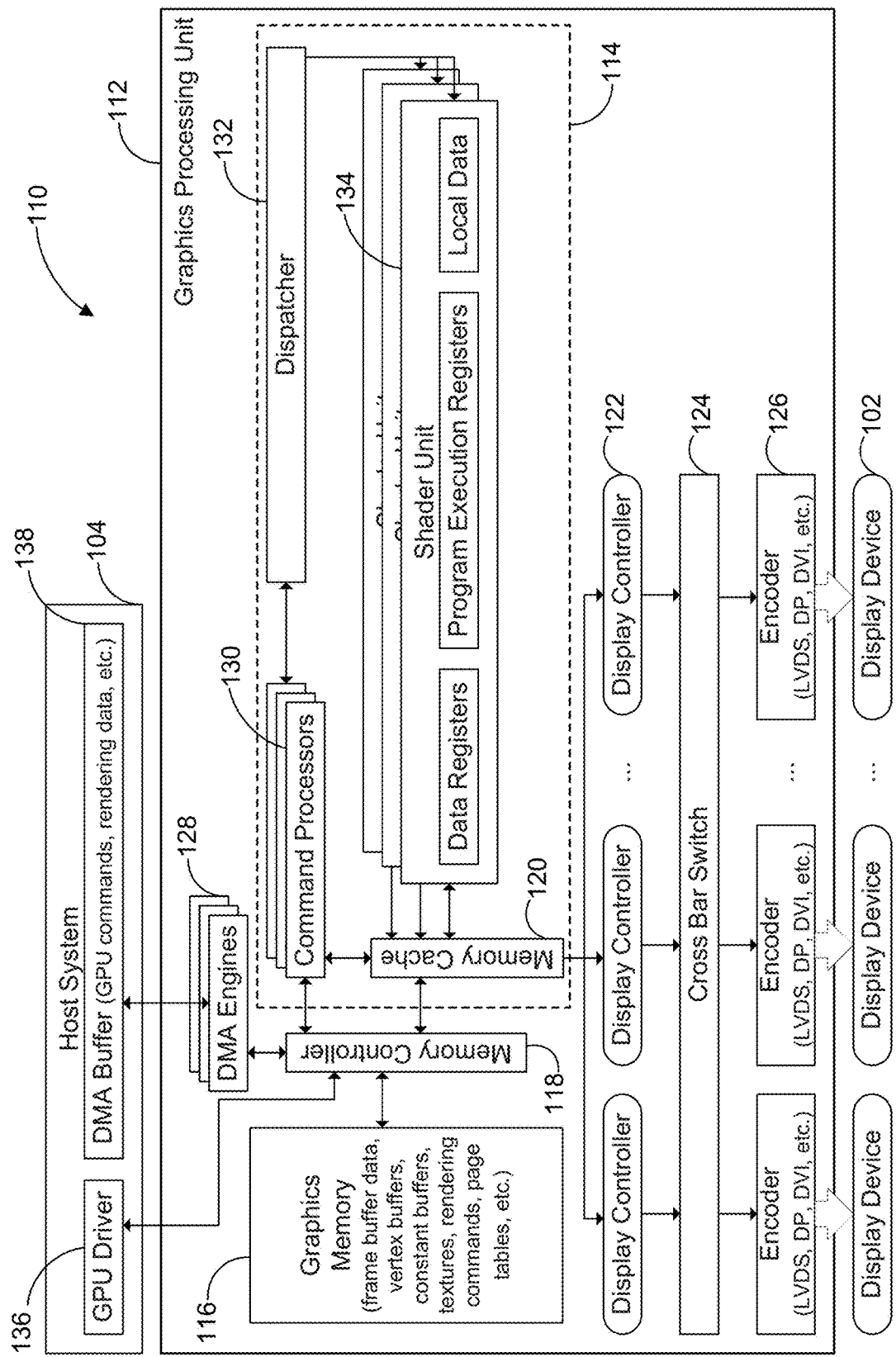
FIG. 2 is a high-level architectural diagram of a graphics system according to at least one embodiment.

Referring now to FIG. 2, illustrated therein is a graphics system 110 according to at least one embodiment. The graphics system 110 may include a GPU 112 and some of the computer 104. In this example the GPU 112 is shown as including graphics memory (sometimes referred to as video memory or VRAM) 116, a memory controller 118, memory cache 120, display controllers 122, a cross-bar switch 124, encoders 126, direct memory access (DMA) engines 128, command processors 130, a dispatcher 132, and shader units 134. Generally, the memory cache 120, command processors 130, dispatcher 132, and shader units 134 may be referred to collectively as a GPU engine 114. The GPU engine 114 may provide GPU subsystems.

Although the GPU 112 in FIG. 2 is shown to include components such as the display controller 122, cross-bar switch 124, and encoders 126, it will be understood that components such as the display controller 122, cross-bar switch 124, and encoders 126 may be logically separate entities from the GPU 112. In particular, the display controller 122, cross-bar switch 124, and encoders 126 may be logically and/or physically separate from the GPU 112.

The graphics system 110 may further include a GPU driver 136 and a DMA buffer 138, which are a part of the computer 104. The memory controller 118 may be coupled to the GPU driver 136. The DMA engines 128 may be coupled to the DMA buffer 138. The DMA buffer 138 may provide commands and rendering data 106 to the DMA engines 128 of the GPU 112.

The graphics memory 116 may store data including, but not limited to, frame buffer data, vertex buffers, constant buffers, textures, rendering commands, page tables. The memory controller 118 may access data stored on the graphics memory 116 and provide data and commands to the GPU engine 114. The GPU engine 114 may process the data and commands and in response, create an image that is provided to the memory controller 118 for storage in the graphics memory 116. The image may include one or more lines, wherein each line includes at least two pixels.

A display controller 122, via the memory controller 118, may extract the image for display from the graphics memory 116. The display controller 122 may convert the image to a display output that is compatible with the display 102. The display output may be provided to the cross bar switch, which in turn, is provided to the encoders 126. The encoders 126 may be coupled to the display 102.

Subsystems of the GPU 112 may be tested. The methods and systems disclosed herein are directed to testing subsystems of a GPU 112. In particular, the methods and systems disclosed herein are directed to testing output generated by the GPU engine 114. Testing of the display controllers 122, DMA engines 128, and graphics memory 116 may be provided by other methods and systems beyond the scope of this disclosure. Generally, testing of DMA engines 128 and VRAM 116 may be a relatively simple process in comparison to testing of GPU subsystems.

GPUs may implement subsystems in different ways. Some GPUs may have direct hardware support for a subsystem. In at least one example, a GPU may have a calculating lighting subsystem to perform lighting calculations. In at least one example, a GPU may have a programmable shader that may perform lighting calculations. In at least one example, a GPU may have a fixed-function subsystem that may perform alpha test graphical operations. In at least one example, a GPU may have a programmable shader that may perform alpha test graphical operations.

The subsystems to be tested may vary depending on the implementation of that subsystem on that GPU. Some GPUs may implement a subsystem within a shader unit 134. Shader units 134 may undergo dedicated testing and subsystems implemented within a shader unit 134 may not require additional tests.

Figure 3:
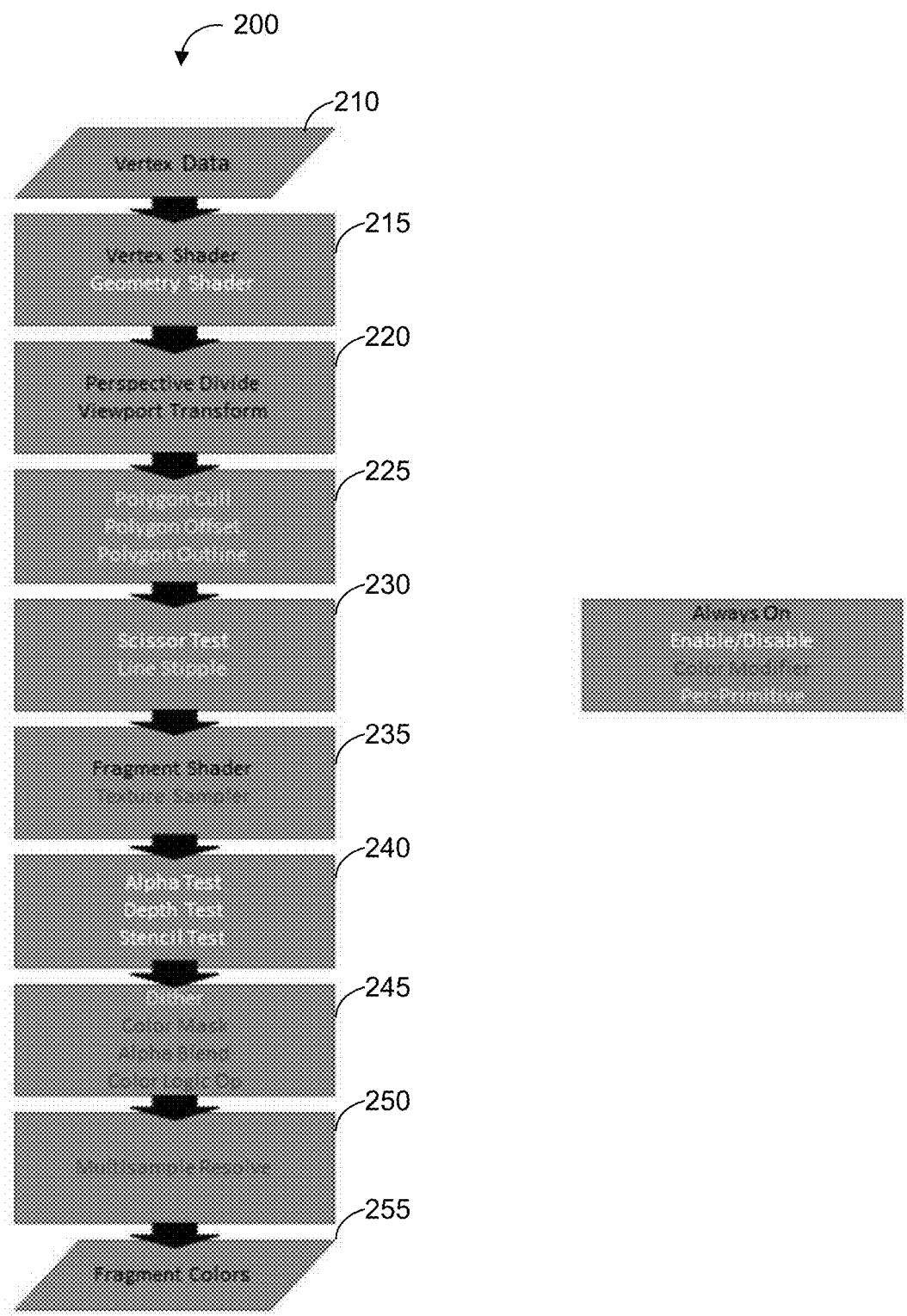
FIG. 3 is a block diagram of a typical GPU 3D engine according to at least one embodiment.

Referring to FIG. 3, there is shown a GPU 3D engine, according to at least one embodiment. The term "GPU subsystems", as used herein, include, but is not limited to the GPU subsystems shown in FIG. 3: vertex shader, geometry shader, perspective divide, viewport transform, polygon cull, polygon offset, polygon outline, scissor test, line stipple, fragment shader, texture sampler, alpha test, depth test, stencil test, dither, color mask, alpha blend, color logic operator, and multi-sample resolve.

At 210, the GPU 3D engine may receive rendering data. In at least one embodiment, rendering data may be vertex data. After receiving rendering data, the subsystems may operate successively. That is, at 215, the vertex shader subsystem and the geometry shader subsystem may operate to modify the rendering data and provide a first modified rendering data. Next, at 220, the perspective divide subsystem and the viewport transform subsystem may operate to modify the first modified rendering data and output a second modified rendering data.

At 225, the polygon cull subsystem, the polygon offset subsystem, and the polygon outline subsystem may operate to modify the second modified rendering data and output a third modified rendering data.

At 230, the scissor test subsystem and the line stipple subsystem may operate to modify the third modified rendering data and output a fourth modified rendering data.

At 235, the fragment shader subsystem and the texture sampler subsystem may operate to modify the fourth modified rendering data and output a fifth modified rendering data.

At 240, the alpha test subsystem, the depth test subsystem, and the stencil test subsystem may operate to modify the fifth modified rendering data and output a sixth modified rendering data.

At 245, the dither subsystem, the color mask subsystem, the alpha blend subsystem, and the color logic operator subsystem may operate to modify the sixth modified rendering data and output a seventh modified rendering data.

At 250, the multi-sample resolve subsystem may operate to modify the seventh modified rendering data and output a last modified rendering data. The last modified rendering data may be fragment colors.

At 255, the GPU 3D engine may output the last modified rendering data to the memory controller 118.

To verify that a GPU is functioning as expected, GPU subsystems may be tested. Generally, testing of GPU subsystems may be performed by operating GPU subsystems in a defined manner. The output of the GPU subsystems may be compared against a known result corresponding to the defined manner.

Some subsystems may be functionally similar with respect to testing. FIG. 3 shows subsystems that are functionally similar with respect to testing as being grouped together. For example, at 225, a Polygon Cuff subsystem, a Polygon Offset subsystem, and a Polygon Outline subsystem may be functionally similar. Subsystems that are functionally similar with respect to testing may be tested by a single test.

Subsystems of the GPU may be generally be activated or deactivated to render a display frame. The term "active subsystems", as used herein, broadly refers to any subsystem of a GPU that is used to render a display frame. The term "inactive subsystems", as used herein, broadly refers to any subsystem of a GPU that is not used to render a display frame. Thus, subsystems may be active for a first display frame and then inactive for a second display frame. For a third display frame, that subsystem may remain inactive. That subsystem may be activated for a fourth display frame.

Some subsystems, herein referred to as "color modification type subsystems", may be activated to modify output color. In at least one embodiment, the texture sampler subsystem, the color mask subsystem, the alpha blend subsystem, the color logic operator subsystem, and the multi-sample resolve subsystem may each be color modification type subsystems. A single test may activate all color modification type subsystems. Color modification type subsystems may be tested using at least one pixel. If the color of the at least one pixel is not the expected color, then at least one of the color modification type subsystems may not be operating as expected.

Some subsystems, herein referred to as "enabling-disabling type subsystems", may be activated to prevent output. In at least one embodiment, the geometry shader subsystem, the scissor test subsystem, the alpha test subsystem, the depth test subsystem, and the stencil test subsystem may each be enabling-disabling type subsystems.

Each enabling-disabling type subsystem may be tested using at least two pixels. A first pixel may test whether the activation of an enabling-disabling type subsystem provides an output. If the first pixel is outputted, then the activation of that enabling-disabling type subsystem may not be operating as expected. A second pixel may test whether the deactivation of that enabling-disabling type subsystem provides an output. If the second pixel is not outputted, then the deactivation of that enabling-disabling type subsystem may not be operating as expected.

Some subsystems, herein referred to as "per-primitive type subsystems", may be activated to modify primitives. In at least one embodiment, the polygon cull subsystem, the polygon offset subsystem, the polygon outline subsystem, the line stipple subsystem, and the dither subsystem may each be per-primitive type subsystems. Per-primitive type subsystems may be tested using multiple outputs, that is, multiple pixels. If at least one output of the multiple outputs is not the expected output, then that per-primitive type subsystems may not be operating as expected. The number of pixels required in a per-primitive test may vary based on the per-primitive type subsystems and the primitive itself. For example, a line stipple subsystem may use more or fewer pixels to draw a dashed line, depending on the pattern of the dashed line. Generally, each per-primitive type subsystem may be tested using at least 10 pixels.

Some subsystems, herein referred to as "always-active type subsystems", may always be activated. In at least one embodiment, the vertex shader subsystem, the perspective divide subsystem, the viewport transform subsystem, and the fragment shader subsystem may each be always-active type subsystems.

A single test may activate all always-active type subsystems. Always-active type subsystems may be tested using at least one pixel. If no output is provided, then at least one of the always-active type subsystems may not be operating as expected. If the output is not an expected output, then at least one of the always-active type subsystems may be operating as expected.

Figure 4:
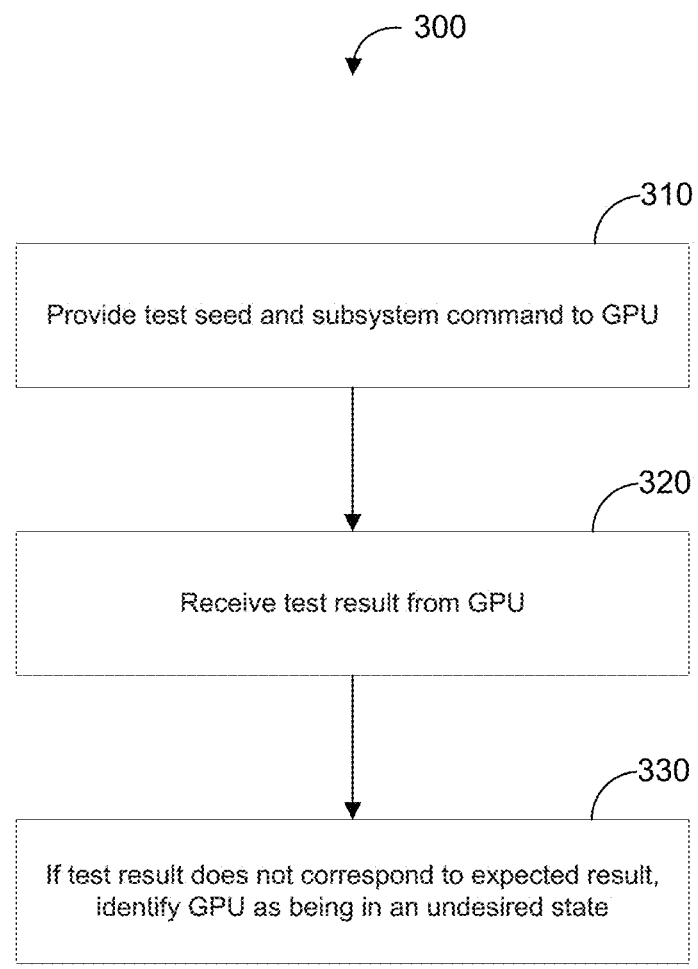
FIG. 4 is a flow diagram of a method for monitoring a GPU of a host computer system according to at least one embodiment.

Reference will now be made to FIG. 4, which shows a flowchart of an example method 300 of monitoring a GPU 112 of a host computer system 100, according to at least one embodiment. The method begins at act 310 when at least one test seed and at least one subsystem command may be provided to the GPU. As used herein, the term "test seed" broadly refers to a sample rendering data. Sample rendering data may include any appropriate byte size. Sample rendering data may be processed to form a single pixel or a plurality of pixels. A plurality of pixels may form a primitive.

In at least one embodiment, the at least one test seed may be processed to generate pixels that are located in a non-visible portion of a display screen 102 coupled to the GPU 112. In at least one embodiment, the at least one test seed may be processed to generate pixels that are located in a non-visible portion of the memory coupled to the GPU 112. In at least one embodiment, the at least one test seed may be processed to generate pixels that are located in a visible portion of a display screen 102 coupled to the GPU 112.

The method continues at act 320 when at least one test result from the GPU 112 may be received in response to providing the at least one test seed and the at least one subsystem command to the GPU. As used herein, the term "test result" broadly refers to output generated by GPU subsystems. When the at least one test seed can be processed to generate pixels that are located in a visible portion of a display screen 102 coupled to the GPU 112, the display screen 102 may not be updated with pixels generated by processing the at least one test result.

After act 320, the method proceeds at act 330. At act 330, if the at least one test result does not correspond to at least one expected result, the GPU 112 may be identified as being in an undesired state. As used herein, the term "GPU state" broadly refers to an aggregate state representative of all subsystems of the GPU engine 114. As used herein, the term "subsystem state" broadly refers to the state of an individual subsystem of the GPU engine 114.

In at least one example, a GPU 3D engine may include the following subsystems: a vertex shader subsystem, which is an always-active type subsystem; a texture sampler subsystem and an alpha blender subsystem, which are color modification type subsystems; a depth tester subsystem and a stencil tester subsystem, which are enabling-disabling type subsystems; and a line stippler subsystem, which is a per-primitive type subsystem. In at least one embodiment, each subsystem may be tested.

When each subsystem is tested in this example, at act 310, one test seed may be provided for both the color modification type subsystems. That is, one test seed and subsystem commands to the texture sampler subsystem and the alpha blender subsystem may be provided to the GPU. The test seed for the color modification type subsystems may be processed to generate a single pixel. After act 310, the method may proceed to act 320 and then act 330 as described above. After act 330, the method may return to act 310 but in this iteration, the method may provide one test seed for each of the enabling-disabling type subsystem. That is, test seeds and subsystem commands to the depth tester subsystem and stencil tester subsystems may be provided to the GPU. Each test seed for the enabling-disabling type subsystem may be processed to generate at least two pixels. After act 310, the method may proceed to act 320 and then act 330 as described above. After act 330, the method may again, return to act 310. In this iteration, the method may provide one test seed for the per-primitive type subsystem. That is, one test seed and subsystem command to the line stippler subsystem may be provided to the GPU. The test seed for the per-primitive type subsystem may be any other suitable number to test the line stippler subsystem. Any of the tests for the color modification type subsystems, enabling-disabling type subsystems, and per-primitive type subsystem may also test the always-active type subsystem. That is, a test seed and subsystem command for the vertex shader subsystem may not be provided to the GPU.

In this example, at act 310, test seeds may be provided for the color modification type subsystems, enabling-disabling type subsystems, and per-primitive type subsystem. That is, a first test seed and subsystem commands to the texture sampler subsystem and the alpha blender subsystem may be provided to the GPU. In addition, a second test seed and subsystem command to the depth tester subsystem, a third test seed and subsystem command to the stencil tester subsystem, and a fourth test seed and subsystem command to the line stippler subsystem may be provided to the GPU. After act 310, the method may proceed to act 320 and then act 330 as described above.

One approach to subsystem testing may be periodic testing of all subsystems of the GPU. This approach might be viable if all subsystems are of the color modification type or always-active type because a single test may test all color modification subsystems and always-active type subsystems. However if the GPU includes enabling-disabling type subsystems and per-primitive type subsystems, the number of test seeds may increase and become computationally intensive.

Continuously testing each GPU subsystem may be computationally intensive and slow down the graphical application 108 to unacceptable levels. It may be desirable to test a subset of subsystems.

Another approach to test a subset of subsystems may be pre-determined. The subsystems to be tested may be pre-determined. The test seeds to be used in tests may also be pre-determined. The selection of subsystems to be tested may be GPU-specific, and in particular, the implementation of subsystems on the GPU. The selection of subsystems may also be based on graphical applications 108 of the host computer system 100. The selection of subsystems may also be based on minimizing the effect of testing on the graphical application 108. When subsystem testing is pre-determined, the method may involve selecting one of a plurality of pre-determined tests.

Another approach to test a subset of subsystems may be to determine the subsystems that are activated by a graphical application 108. The subsystems that are activated by a graphical application 108 may be determined by monitoring which subsystems are invoked by a graphical application 108. In at least one embodiment, the graphics system may include a graphics driver that implements a render module code. The render module code may identify when a subsystem is activated. For example, when a graphical application 108 makes a "draw primitive" instruction, the graphics driver may identify the subsystems that are currently activated. After some time, the graphics driver may have a list of subsystems that are activated. The number of subsystems that are tested may be reduced by only testing the subsystems that are identified as being active. Subsystems that are not identified as being active may remain untested.

Figure 5:
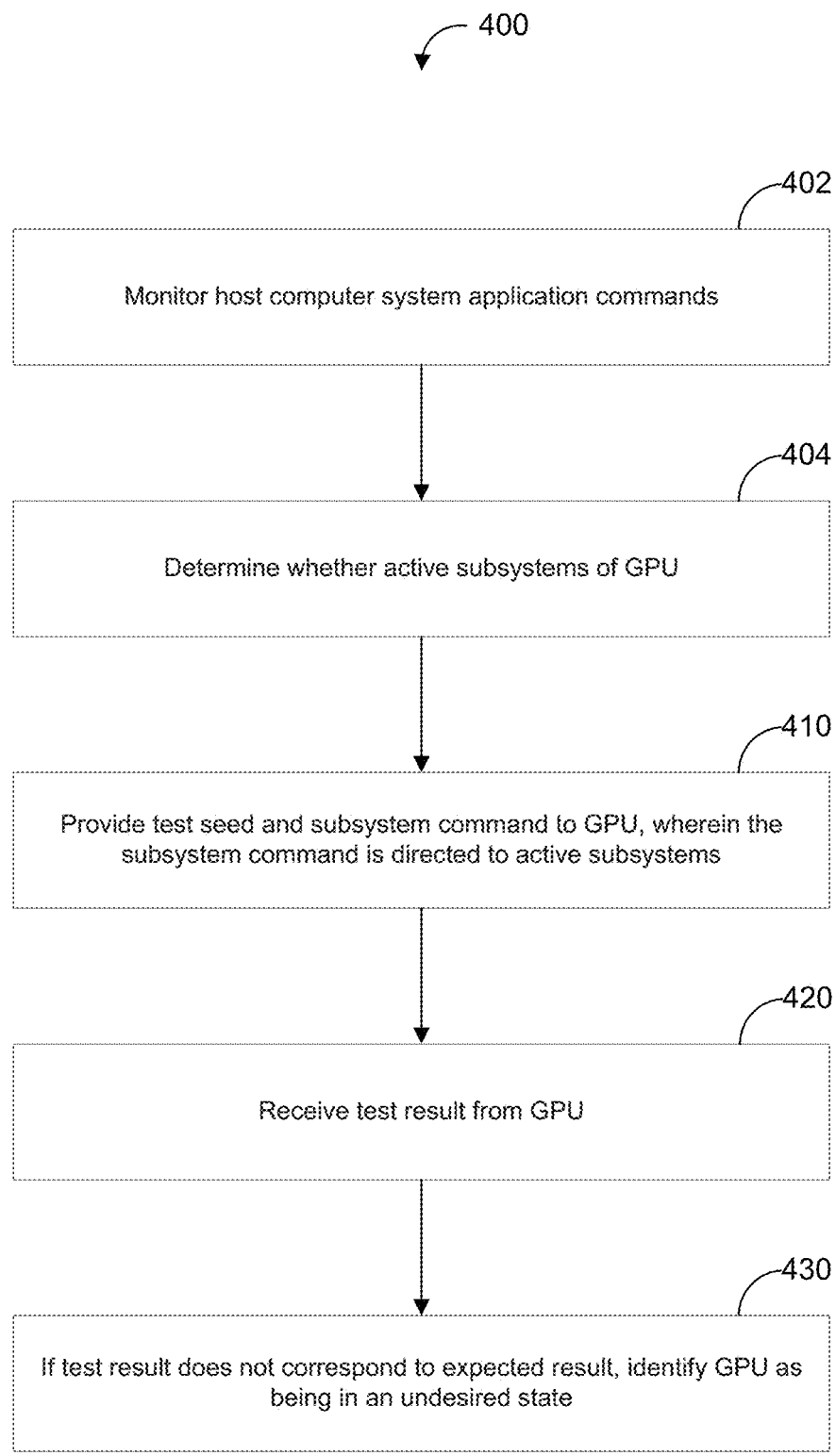
FIG. 5 is a flow diagram of a method for monitoring a GPU of a host computer system according to at least a second embodiment.

Reference will now be made to FIG. 5, which shows a flowchart of an example method 400 of monitoring a GPU 112 of a host computer system 100, according to at least one embodiment. The method begins at act 402 when one or more host computer system application commands may be monitored for a test interval. In at least one embodiment, monitoring host computer system application commands to the GPU may involve scanning a memory buffer of the host computer system for application commands directed to the GPU. In some embodiments, state changes may be logged as they are invoked by an application.

A test interval may be a display frame. Alternatively, a test interval may be a time period. When the test interval is a time period, the time period should be sufficiently fast to ensure that there may be minimal delay between the time that a subsystem is in an undesired state, that is, when the subsystem ceases to operate as expected, and the time that the undesired state is identified. Any appropriate time period may be used. For example, the test interval may have a duration of one second. Multiple display frames may be drawn in a time period.

The method continues at act 404 when the host computer system application commands may be determined to cause subsystems of the GPU to be active for that test interval. When the test interval is a display frame, the graphics driver may identify the subsystems that are activated to draw the display frame. When the test interval is a time period, the graphics driver may identify the subsystems that are activated to draw any one of the display frames within the time period.

The method continues at act 410 when at least one test seed and at least one subsystem command is provided to the GPU. Act 410 is similar to act 310. However, in act 410, the at least one subsystem command may be directed to subsystems of the GPU that are determined to be active in act 404. The method continues to acts 420 and 430. Act 420 is similar to act 320, which is described above. Likewise, act 430 is similar to act 330, which is described above.

In at least one example, a GPU 3D engine may include the following subsystems: a vertex shader subsystem, which is an always-active type subsystem; a texture sampler subsystem and an alpha blender subsystem, which are color modification type subsystems; a depth tester subsystem and a stencil tester subsystem, which are enabling-disabling type subsystems; and a line stippler subsystem, which is a per-primitive type subsystem.

In this example, the texture sampler subsystem, the alpha blender subsystem, and the line stippler subsystem may be determined to be active at act 404.

In this example, at act 410, one test seed may be provided for both the color modification type subsystems. That is, one test seed and subsystem commands to the texture sampler subsystem and the alpha blender subsystem may be provided to the GPU. The test seed for the color modification type subsystems may be processed to generate a single pixel. After act 410, the method may proceed to act 420 and then act 430 as described above. After act 430, the method may return to act 310 but in this iteration, the method may provide one test seed for the per-primitive type subsystem. That is, one test seed and subsystem command to the line stippler subsystem may be provided to the GPU. The test seed for the per-primitive type subsystem may be any other suitable number to test the line stippler subsystem. In this example, the vertex shader subsystem, depth tester subsystem and stencil tester subsystem may not be determined to be activated. Accordingly, these inactive subsystems may not be tested.

In this example, at act 410, test seeds may be provided for the color modification type subsystems and per-primitive type subsystem. That is, a first test seed and subsystem commands to the texture sampler subsystem and the alpha blender subsystem may be provided to the GPU. In addition, a second test seed and subsystem command to the line stippler subsystem may be provided to the GPU. After act 410, the method may proceed to act 420 and then act 430 as described above.

Depending on the GPU architecture, it may be possible to test each subsystem. That is, a test seed may be provided for each subsystem command. However, if the test seeds may be processed to generate pixels in non-visible portions of the display screen 102 or memory, the number of subsystems may require too many pixels to fit within the non-visible portion. In such cases, a test seed may be provided to test more than one subsystem. In at least one example, a test seed may be used for testing a color modification type subsystems as well as an enabling-disabling type subsystem. This approach may result in fewer pixels being tested. That is, this approach may result in using smaller non-visible portions of the display screen 102 or memory. However, this approach may increase the number of tests being performed due to the successive testing of a single pixel.

In addition to subsystems that are activated by a graphical application 108, some subsystems may be active without being activated by a graphical application 108. All subsystems of a GPU may be identified as either an exposed subsystem or an unexposed subsystem. The term "exposed subsystems", as used herein, broadly refers to any subsystem of a GPU that a graphical application 108 may access. The term "unexposed subsystems", as used herein, broadly refers to any subsystem of a GPU that a graphical application 108 cannot access. Whether a subsystem is an exposed or unexposed subsystem depends on how the subsystem is implemented on the GPU.

Figure 6:
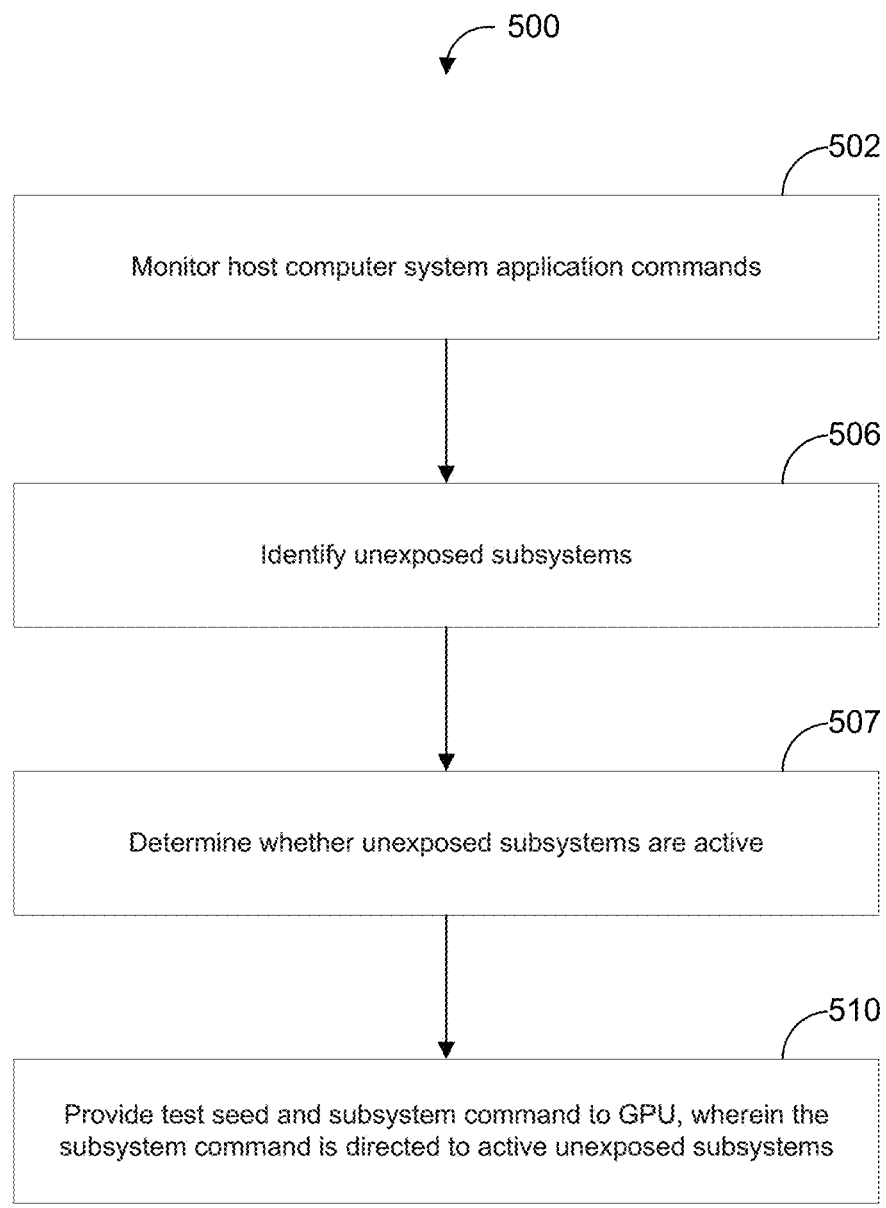
FIG. 6 is a flow diagram of a method for monitoring a GPU of a host computer system according to at least a third embodiment.
Figure 7:
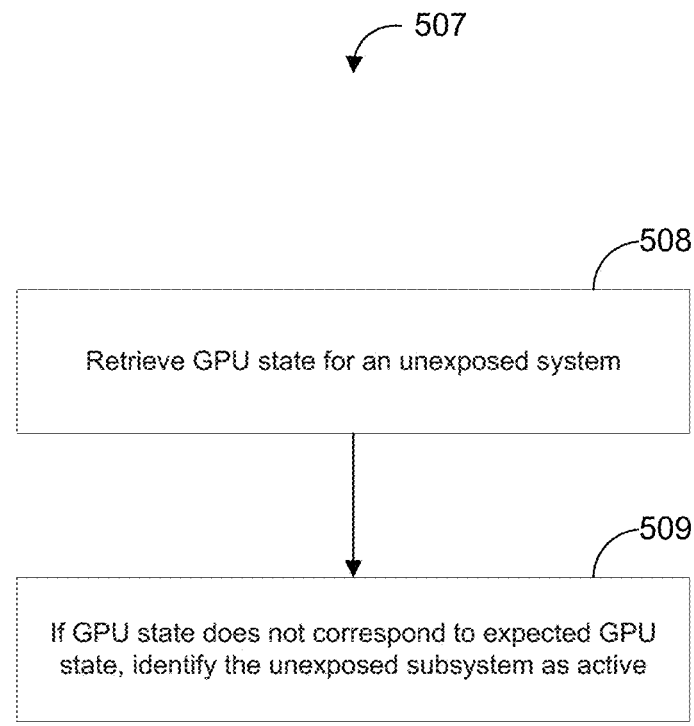
FIG. 7 is a flow diagram of a method for determining whether unexposed subsystems are active, according to at least one embodiment.

Reference will now be made to FIGS. 6 and 7. FIG. 6 shows a flowchart of an example method 500 of monitoring a GPU 112 of a host computer system 100, according to at least one embodiment. The method begins at act 502. Act 502 is similar to act 402, which is described above. Since a graphical application 108 generally may not access unexposed subsystems, subsystems that are not instructed by a graphical application 108 may be an unexposed subsystem. At act 506, one or more subsystems of the GPU that are not instructed by host computer system application commands may be identified as being unexposed subsystems.

After act 506, the method continues to act 507. At act 507, subsystems determined to potentially be unexposed in act 506 may be determined to be active. In at least one embodiment, acts 506 and 507 may be performed concurrently with, before, or after, act 404.

The method continues at act 510 when at least one test seed and at least one subsystem command is provided to the GPU. Act 510 is similar to act 410 described above. However, in act 510, the at least one subsystem command may be directed to subsystems of the GPU that are determined to be active in act 507. That is, the at least one subsystem command may be directed to subsystems of the GPU that are not instructed by host computer system application commands but are determined to be active.

FIG. 7 shows a flow chart of an example method of 507 for determining whether unexposed subsystems are active, according to at least one embodiment. The method begins at act 508 when a GPU state for an unexposed subsystem is retrieved. In at least one embodiment, the GPU state for an unexposed subsystem may be retrieved from register data corresponding to that unexposed system. The method continues to act 509. At act 509, if the GPU state for that unexposed subsystem is determined to not correspond to an expected GPU state for that unexposed subsystem, the unexposed subsystem may be identified as being active. In at least one embodiment, the GPU state for an unexposed subsystem may be determined by a register value for that subsystem.

Figure 8:
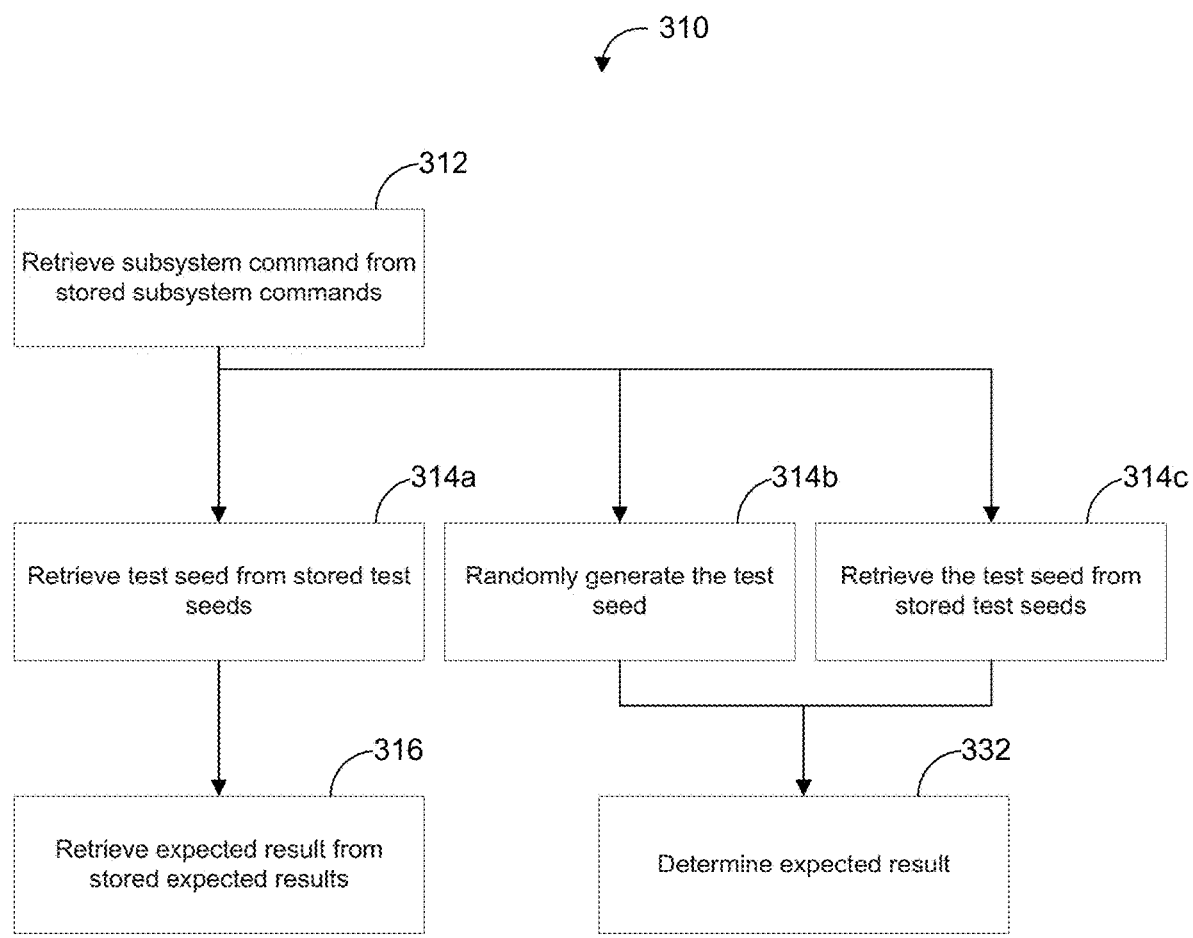
FIG. 8 is a flow diagram of example methods for providing at least one test seed and at least one subsystem command to the GPU.
Figure 9:
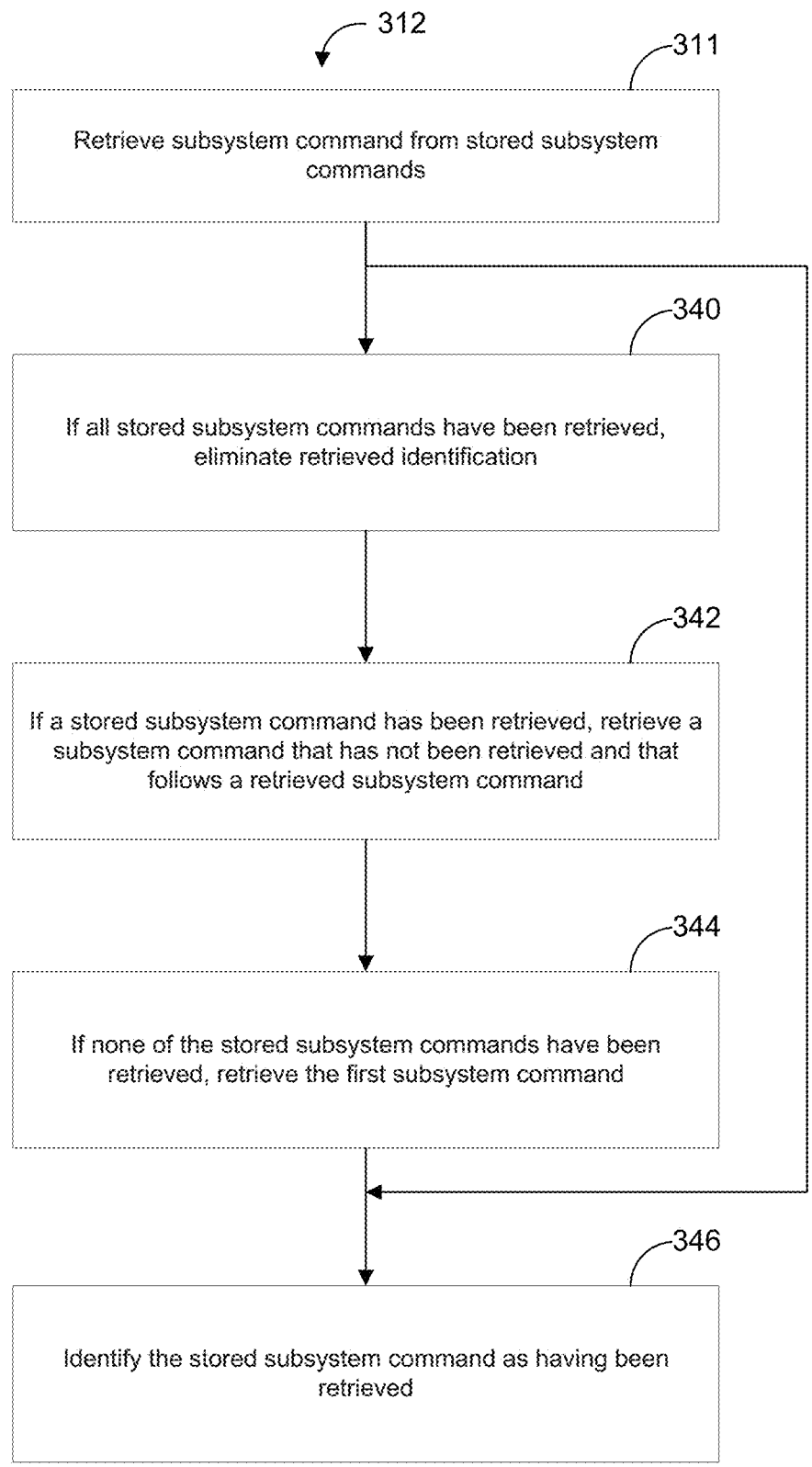
FIG. 9 is a flow diagram of example methods for retrieving the at least one subsystem command from a plurality of stored subsystem commands.

Reference will now be made to FIGS. 8 and 9. FIG. 8 shows a flow chart of example methods of 310 for providing at least one test seed and at least one subsystem command to the GPU. The method begins at act 312 when the at least one subsystem command may be retrieved from a plurality of stored subsystem commands. The plurality of stored subsystem commands may be stored in memory. The method may continue to one of act 314a, 314b, and 314c.

At act 314a, the at least one test seed may be retrieved from a plurality of stored test seeds based on the at least one subsystem command. The plurality of stored test seeds may be stored in memory. After act 314a, the method continues at act 316 when the at least one expected result may be retrieved from a plurality of stored expected results based on the retrieved at least one test seed. The plurality of stored expected results may be stored in memory.

When the at least one expected result is retrieved based on the retrieved at least one test seed, the expected result may be uniquely determined by the test seed. In at least one embodiment, the at least one expected result may be retrieved further based on the retrieved at least one subsystem command. That is, a test seed may be combined with more than one subsystem command. The retrieval of an expected result may be uniquely determined by a combination of the test seed and the subsystem command.

At act 314b, the at least one test seed may be randomly generated. Act 314c may be similar to act 314a in that the at least one test seed may be retrieved from a plurality of stored test seeds. However, at act 314c, the at least one test seed may not have a stored relationship with the at least one subsystem command.

After acts 314b or 314c, the method may continue to act 332 and subsequently to act 330. At act 330, the method includes determining the at least one expected result based on the at least one subsystem command of act 312 and the at least one test seed of acts 314b or act 314c. Generally, the determination of the at least one expected result may be performed on the CPU of the computer 104.

FIG. 9 shows a flow chart of an example method of 312 for retrieving at least one subsystem command from a plurality of stored subsystem commands, according to at least one embodiment. At act 311, at least one subsystem command may be retrieved from a plurality of stored subsystem commands. The method may continue to one of act 340 and 346.

At act 346, the stored subsystem command corresponding to the retrieved at least one subsystem command may be identified as having been retrieved. This identification may be stored in memory. This identification allows the subsystem commands to be selectively tested. In at least one embodiment, some subsystems may be tested more frequently than other subsystems. For one example, a first subsystem may be tested twice before a second subsystem undergoes a first test. In at least another embodiment, each subsystem must be tested at least once before any subsystem may be re-tested. That is, only stored subsystem commands that are not identified as having been retrieved may be retrieved as the at least one subsystem command.

When each subsystem must be tested at least once before any subsystem may be re-tested, the method may include an additional step (not shown) of determining if each of the stored subsystem commands is identified as having been retrieved. If all stored subsystem commands are identified as having been retrieved, the identification of stored subsystem commands as having been retrieved may be eliminated. That is, if all stored subsystem commands have been retrieved, the identification of stored subsystems as having been retrieved resets, or restarts and re-testing of subsystems may begin.

In at least one embodiment, the plurality of stored subsystem commands may form an ordered set of subsystem commands to the GPU. The ordered set of subsystem commands may begin with a first subsystem command and end with a last subsystem command. The ordered set may include subsystem commands, or interior subsystem commands, after the first subsystem command and before the last subsystem command. When the plurality of stored subsystem commands form an ordered set, the method may continue at act 340 after act 311.

At act 340, if each of the stored subsystem commands is identified as having been retrieved, the identification of stored subsystem commands as having been retrieved may be eliminated. If the identification indicates that the last subsystem command has been tested, then the identification may be reset, or restarted so that re-testing of subsystems may begin again.

At act 342, If at least one of the stored subsystem commands are identified as having been retrieved, a subsystem command that is not identified as having been retrieved and that follows a subsystem command that is identified as having been retrieved may be retrieved. If the identification indicates that testing of the ordered set is partly underway, then the subsystem command that may be retrieved is the next subsystem command in the ordered set. The next subsystem command of the ordered set may be identified by being the subsystem command that is not identified as having been retrieved as well as being a next subsystem command after the previous subsystem of the ordered set has been tested.

After act 342, the method proceeds to act 344. At act 344 if none of the stored subsystem commands are identified as having been retrieved, the first subsystem command may be retrieved. After act 344, the method proceeds to act 346. Act 346 is described above. After each subsystem of the ordered set of subsystems has been tested, testing may be restarted at the first of the ordered set of subsystems.

Figure 10:
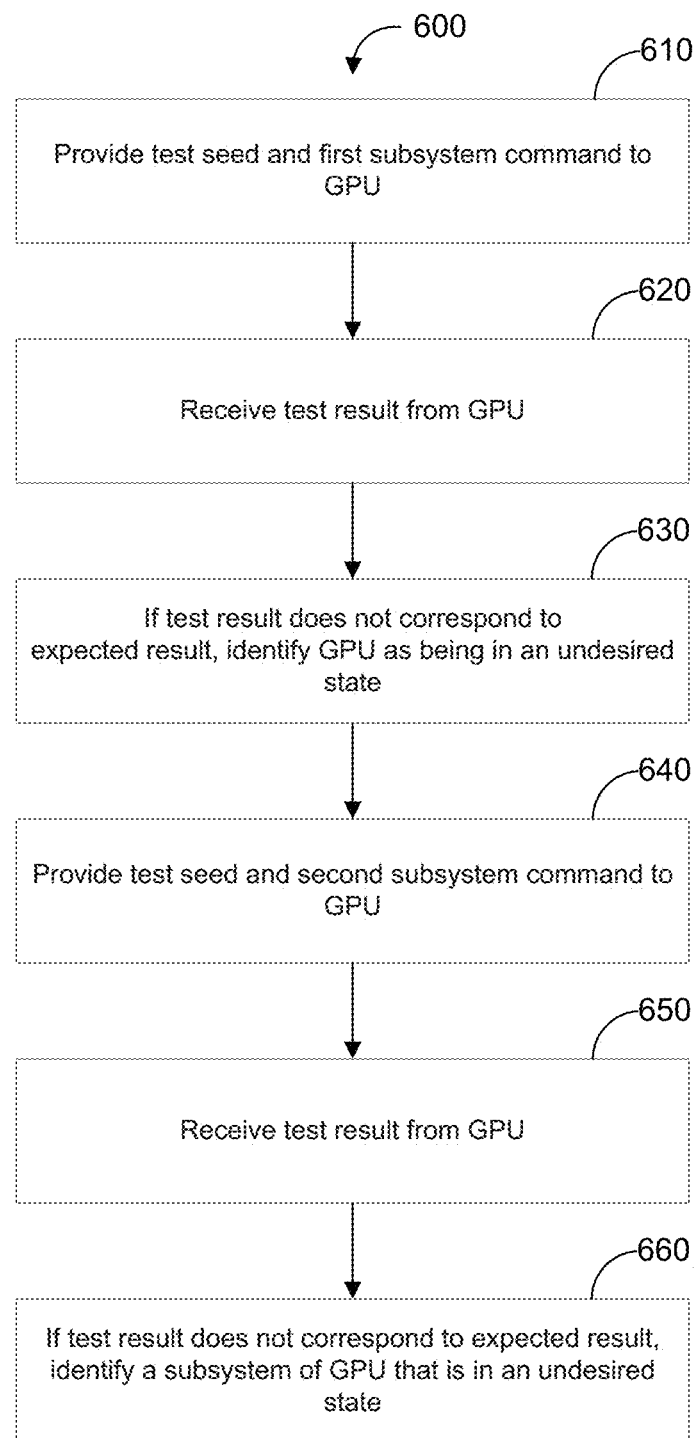
FIG. 10 is a flow diagram of a method for monitoring a GPU of a host computer system according to at least a fourth embodiment.

Reference will now be made to FIG. 10, which shows a flow chart of an example method of 600 of monitoring a GPU 112 of a host computer system 100, according to at least one embodiment. As described above, some tests may test more than one subsystem. An output that does not correspond to the expected output may indicate that at least one of the subsystems tested may not operate as expected. It may be desirable to determine the particular subsystem that does not operate as expected.

In at least one embodiment, the method 600 may begin at act 610 and continue to acts 620 and 630, similar to method 300. After the GPU is identified as being in an undesired state in act 630, the method may proceed to act 640. Act 640 may be similar to act 610 with the exception that the at least one subsystem command may be different from the at least one subsystem command of act 610, the previous iteration. In one example, a test seed and the subsystem commands for the texture sampler subsystem and an alpha blender subsystem, both of which are color modification type subsystems, may be provided to the GPU at act 610. At act 630, the one test result may not correspond to the expected test result. At act 640, a test seed and the subsystem command for the texture sampler subsystem may be provided to the GPU. In contrast, both subsystem commands were provided to the GPU in the first iteration at act 610. After act 610, the method may continue to acts 650 and 660, similar to 620 and 630.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. A non-transitory computer-readable storage medium having instructions stored thereon for execution by at least one processing unit, the instructions for implementing a method comprising:
   providing at least one test seed and at least one subsystem command to the GPU;
   monitoring one or more host computer system application commands to the GPU for a test interval;
   determining whether the host computer system application commands cause subsystems of the GPU to be active for that test interval;
   receiving at least one test result from the GPU in response to providing the at least one test seed and the at least one subsystem command to the GPU, wherein the at least one subsystem command to the GPU is directed to subsystems determined to be active; and
   if the at least one test result does not correspond to at least one expected result, identifying the GPU as being in an undesired state.

2. The non-transitory computer-readable storage medium of claim 1, wherein the test interval comprises one of a time period and a display frame.

3. The non-transitory computer-readable storage medium of claim 1, wherein the method further comprises:
   identifying one or more subsystems of the GPU that are not instructed by host computer system application commands as being unexposed subsystems; and
   determining whether unexposed subsystems are active, wherein the at least one subsystem command to the GPU is further directed to unexposed subsystems determined to be active.

4. The non-transitory computer-readable storage medium of claim 3, wherein the determining whether unexposed subsystems are active comprises:
   retrieving a GPU state for an unexposed subsystem; and
   if the GPU state does not correspond to an expected GPU state, identifying the unexposed subsystem as being active.

5. The non-transitory computer-readable storage medium of claim 1, wherein subsystems of the GPU comprise at least one of a plurality of subsystem types, and wherein the at least one subsystem command to the GPU is directed to at least one subsystem of each subsystem type having at least one active subsystem.

6. The non-transitory computer-readable storage medium of claim 5, wherein the plurality of subsystem types comprise a color modification type, an enabling-disabling type, a per-primitive type, and an always-active type.

7. The non-transitory computer-readable storage medium of claim 5, wherein the plurality of subsystem types comprise a color modification type, and wherein subsystems of the color modification type comprise at least one of a pixel shader, a texture sampler, an alpha blender, a color logic operator, a color masker, a multi-sampler, and a ditherer.

8. The non-transitory computer-readable storage medium of claim 5, wherein the plurality of subsystem types comprise an enabling-disabling type, and wherein subsystems of the enabling-disabling type comprise at least one of a geometry shader, a depth tester, a stencil tester, a scissor tester, and an alpha tester.

9. The non-transitory computer-readable storage medium of claim 5, wherein the plurality of subsystem types comprise a per-primitive type, and wherein subsystems of the per-primitive type comprise at least one of a ditherer, a line stippler, a cull face tester, a polygon offset, a polygon outliner, a perspective divider, and a viewport transformation.

10. The non-transitory computer-readable storage medium of claim 5, wherein the plurality of subsystem types comprise an always-active type, and wherein subsystems of the always-active type comprise at least one of a vertex shader, a pixel shader, a perspective divider, and a viewport transformation.

11. The non-transitory computer-readable storage medium of claim 1, wherein the providing at least one test seed and at least one subsystem command to the GPU comprises retrieving the at least one subsystem command to the GPU from a plurality of stored subsystem commands to the GPU.

12. The non-transitory computer-readable storage medium of claim 11, wherein the retrieving the at least one subsystem command to the GPU further comprises identifying the stored subsystem command corresponding to the retrieved at least one subsystem command as having been retrieved.

13. The non-transitory computer-readable storage medium of claim 12, wherein the at least one subsystem command corresponds to stored subsystem commands that are not identified as having been retrieved, and wherein the retrieving the at least one subsystem command to the GPU further comprises, if each of the stored subsystem commands are identified as having been retrieved, eliminating the identification of stored subsystem commands as having been retrieved.

14. The non-transitory computer-readable storage medium of claim 12, wherein each of the stored subsystem commands is retrieved with a minimum frequency for that subsystem command.

15. The non-transitory computer-readable storage medium of claim 12, wherein the plurality of stored subsystem commands to the GPU comprises an ordered set of subsystem commands to the GPU having a first subsystem command and a last subsystem command, and wherein the retrieving the at least one subsystem command to the GPU further comprises, before the identifying the stored subsystem command corresponding to the retrieved at least one subsystem command as having been retrieved:
    if each of the stored subsystem commands are identified as having been retrieved, eliminating the identification of stored subsystem commands as having been retrieved;
    if at least one of the stored subsystem commands are identified as having been retrieved, retrieving a subsystem command that is not identified as having been retrieved and that follows a subsystem command that is identified as having been retrieved; and
    if none of the stored subsystem commands are identified as having been retrieved, retrieving the first subsystem command.

16. The non-transitory computer-readable storage medium of claim 11, wherein the providing at least one test seed and at least one subsystem command to the GPU further comprises:
    retrieving the at least one test seed from a plurality of stored test seeds based on the at least one subsystem command; and
    retrieving the at least one expected result from a plurality of stored expected results based on the retrieved at least one test seed.

17. The non-transitory computer-readable storage medium of claim 16, wherein the retrieving the at least one expected result further comprises retrieving the at least one expected result based on the at least one subsystem command.

18. The non-transitory computer-readable storage medium of claim 1, wherein the providing at least one test seed and at least one subsystem command to the GPU comprises one of randomly generating the at least one test seed and retrieving the at least one test seed from a plurality of stored test seeds, and wherein the receiving at least one test result from the GPU further comprises determining the at least one expected result based on the at least one test seed and the at least one subsystem command.

* * * * *